United States Patent [19]
Wolff et al.

[11] Patent Number: 5,670,886
[45] Date of Patent: *Sep. 23, 1997

[54] METHOD AND APPARATUS FOR SENSING PROXIMITY OR POSITION OF AN OBJECT USING NEAR-FIELD EFFECTS

[75] Inventors: Peter U. Wolff, Winter Haven; Marshall E. Smith, Jr., Eaton, both of Fla.

[73] Assignee: Wolf Controls Corporation, Winter Haven, Fla.

[*] Notice: The term of this patent shall not extend beyond the expiration date of Pat. No. 5,459,405.

[21] Appl. No.: 471,192

[22] Filed: Jun. 7, 1995

Related U.S. Application Data

[63] Continuation-in-part of Ser. No. 703,269, May 22, 1991, Pat. No. 5,459,405.

[51] Int. Cl.⁶ .................. G01R 27/00; G01B 7/14; G01P 3/44
[52] U.S. Cl. .................. 324/644; 324/160; 324/165; 324/207.2; 324/207.21; 324/632
[58] Field of Search .................. 324/160, 163–166, 324/207.25, 207.26, 637, 638, 642, 644, 645, 646; 340/551, 552, 553, 671, 672; 342/27, 28, 118, 127, 128, 458; 331/65

[56] References Cited

U.S. PATENT DOCUMENTS

| | | |
|---|---|---|
| Re. 25,100 | 12/1961 | Chapin . |
| 3,210,752 | 10/1965 | Bojko .................. 340/653 X |
| 3,599,197 | 8/1971 | Boyko .................. 342/28 X |
| 3,925,774 | 12/1975 | Amlung . |
| 3,965,470 | 6/1976 | Clinard et al. . |
| 4,142,153 | 2/1979 | Smith .................. 324/165 |
| 4,384,819 | 5/1983 | Baker .................. 324/644 X |
| 4,983,914 | 1/1991 | Baranski .................. 324/207.26 X |
| 5,012,207 | 4/1991 | Edwards .................. 324/207.25 X |
| 5,227,667 | 7/1993 | Takinami et al. .................. 324/207.26 X |
| 5,459,405 | 10/1995 | Wolff et al. .................. 324/644 |

FOREIGN PATENT DOCUMENTS

| | | |
|---|---|---|
| 0 590190A1 | 9/1992 | European Pat. Off. . |
| 0 605847A1 | 12/1993 | European Pat. Off. . |
| 2 495 327 | 4/1982 | France . |
| 2239640 | 2/1974 | Germany . |
| 2357381 | 5/1974 | Germany . |
| 4222037 A1 | 1/1994 | Germany . |
| 2034479 | 11/1978 | United Kingdom . |
| 2 067 295 | 1/1980 | United Kingdom . |
| 8500428 | 7/1984 | WIPO . |

*Primary Examiner*—Gerard R. Strecker
*Attorney, Agent, or Firm*—Allen, Dyer, Doppelt, Milbrath & Gilchrist, P.A.

[57] ABSTRACT

A method and apparatus for sensing proximity of an object using near-field effects or magnetic effects. The sensor chips are designed to accommodate numerous sensing elements. In the electromagnetic sensor, radio frequency energy is fed to an antenna. The antenna radiates this radio frequency energy to charge the surface of an object. When the position of the object changes, the impedance of the antenna due to near-field effects changes. This impedance change is detected to provide an indication of the object's movement. In the magnetic sensor, the sensing element is placed at a right angle to the sensor electronics to provide a smaller surface area across the diameter of the sensor. The magnet that charges the object to be detected is manufactured as a part of the sensor encapsulant. The sensing device may be packaged to be inserted into a wall to provide a sensor having a leak-free seal.

11 Claims, 5 Drawing Sheets

FIG. 1. SIMPLIFIED BLOCK DIAGRAM

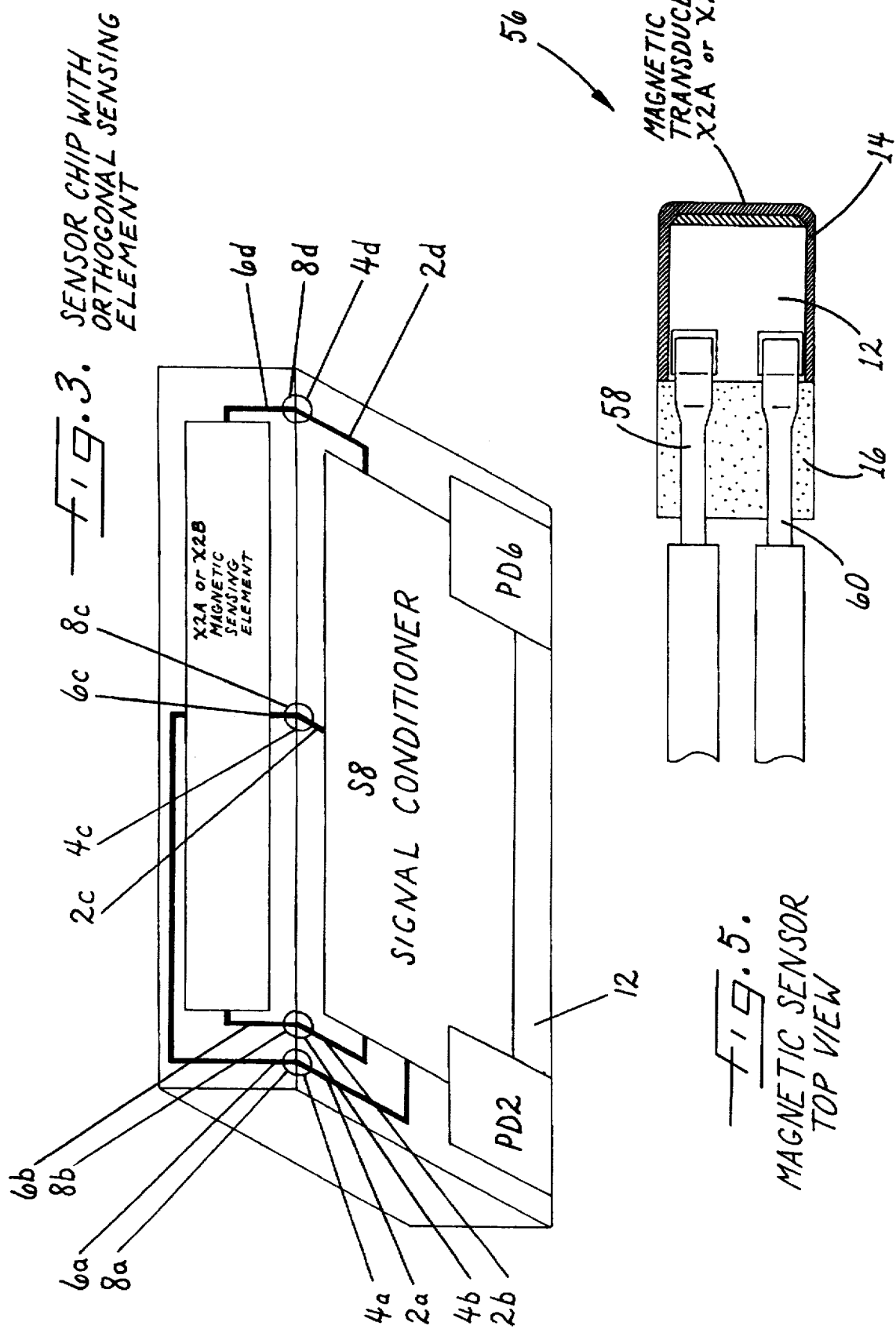

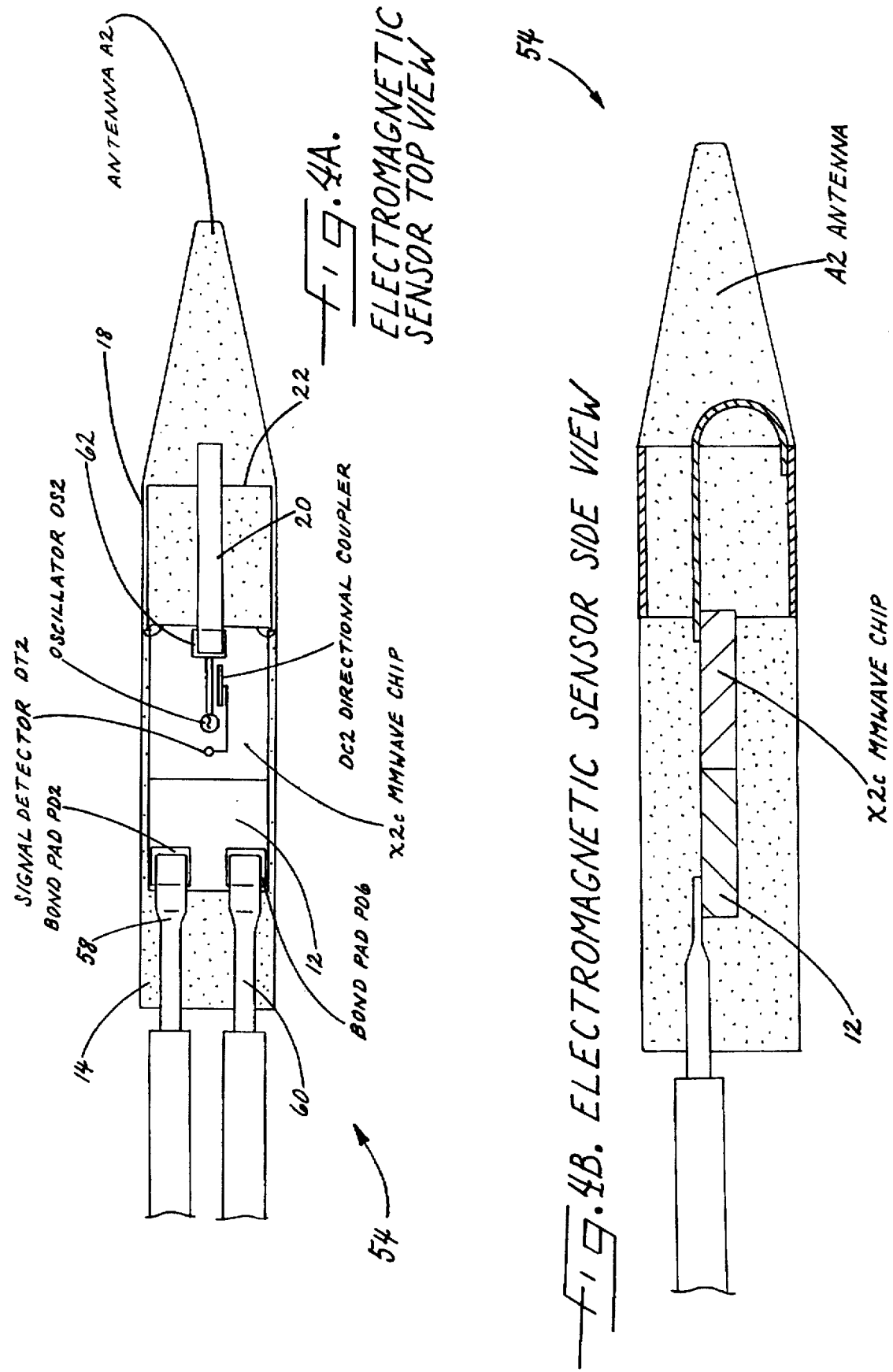

ELECTROMAGNETIC SENSOR INSTALLED

METHOD AND APPARATUS FOR SENSING PROXIMITY OR POSITION OF AN OBJECT USING NEAR-FIELD EFFECTS

CROSS-REFERENCE TO RELATED APPLICATION

This application is a continuation-in-part of application "Method and Apparatus for Sensing Proximity or Position of an Object Using Near-Field Effects," Ser. No. 07/703,269, filed May 22, 1991, and now issued U.S. Pat. No. 5,459,405.

BACKGROUND OF THE INVENTION

1. Field of the Invention

This invention relates to sensing the proximity of an object using an electronic sensor, and more particularly, to using a sensor that responds to near-field electromagnetic effects or to changes in magnetic flux density resulting from changes in the position of an object.

2. Related Art

A position sensor is commonly used to determine the actual location of an object, whereas a proximity sensor is used to determine when an object moves past a certain point or position. Numerous proximity sensors are known in the art that react to various physical or electrical properties. The object to be detected is generally referred to as a target object or simply as a target. Previously disclosed magnetic proximity sensors require that the target be constructed of a ferrous or magnetic material and that the sensor be located at a precise and close distance to the target. These sensors cannot distinguish between movements of the target and of other objects in close proximity to the target or the sensor. Prior devices are not designed to sense small objects at an extended range of close distances and are generally both bulky and expensive.

Capacitive and optical proximity sensors cannot operate through some cloudy gases or most liquids. Existing electromagnetic sensors use the Doppler effect and cannot detect the proximity of an object that moves slowly or that remains in one position for any length of time. Ultrasonic sensors cannot operate in environments where acoustic noise prevails such as on moving machinery.

Sensing Elements

A sensing element generates an electrical signal indicative of, perhaps proportional to, the distance between the sensor and a target. Contact-type sensing elements are generally physically connected to the target. Generally there are three types of noncontact sensing elements: magnetic types that measure the relative magnetic flux density caused by changes in the position of a magnetic target, electrical types that sense changes in electrical properties such as the capacitance or the inductance of the target, which change as the target moves, and optical types that generate a flow of photons and measure the time it takes the photons to travel to the target and back.

Contact-type proximity sensors generally are not suited for applications where the target moves rapidly or where the target cannot be physically connected to the sensor, such as in monitoring rotating objects.

Many proximity sensors use magnetic sensing elements because most machines have valves or gears that are made of magnetic materials. The targets can generally be fitted with a magnet, or can be magnetized themselves. The sensor is applied by placing it in a position such that the magnetic lines of flux from the target magnet pass through the magnetic sensing element. The magnetic flux density is inversely proportional to the distance to the target and is therefore a direct function of the distance between the target and the sensor.

The target does not have to be magnetized if a magnet is placed behind the sensing element opposite the target. When the target moves closer it will tend to concentrate the flux density, and when it moves farther away it will separate the magnetic lines of flux cutting across the sensing element in the same manner as when the magnet is attached to the target. Prior magnetic proximity sensors place the magnet as a separate component in the sensor package and are thus bulky and relatively expensive to manufacture.

There are two primary types of magnetic sensing elements that can be realized on a chip, the Hall element and the magnetoresistor. The Hall element is less sensitive than the magnetoresistor and is therefore used for larger targets.

The magnetic sensing element must be placed parallel to the magnetic pole of the magnet for best operation. This allows the magnetic lines of flux to penetrate the magnetic sensing element at right angles and induces the maximum signal from the magnetic sensing element. The signal from the magnetic sensing element is an analog voltage inversely proportional to the distance to the magnet. In prior magnetic sensors the sensing element is usually fabricated on the same chip as the sensor signal conditioner such that the signal conditioner and the sensing element are on the same surface of the chip. The signal conditioner is usually many times larger than the sensing element. Thus the surface area of the chip is determined primarily by the size of the signal conditioner. The magnetic sensing element must be placed in the magnetic field so the magnetic lines of force intersect it perpendicular to the plane of the chip. Since the signal conditioner is also on the same plane, the diameter of the sensor is determined mostly by the area occupied by the signal conditioner.

Electrical sensing elements generally fall into three types: capacitive, inductive, and types based on radar principles. The capacitive type forms one plate of a capacitor, while the target forms the other plate. When the target comes closer, the capacitance increases, and as it moves away the capacitance decreases. The sensor contains an oscillator whose frequency is dependent on the capacitance of the target and sensor capacitor plate combined. The output is generally a linear output proportional to target distance. The capacitor used must be fairly large, requiring that the sensor diameter be rather large. Also the capacitive sensing element cannot be surrounded by fluids that affect the capacitance, nor can it be in close proximity to other moving objects.

The inductive-type sensing element uses the electromagnetic properties of the target to modulate the inductance of an inductor in the sensor. An oscillator in the sensor is designed to oscillate only over narrow ranges of inductance. When the target moves such that it causes the inductance to change beyond a critical point, the circuit stops oscillating. The output of the inductive sensing element is therefore one of two voltage levels, one level being on when the target is not in close proximity and the other when the target moves close enough to the sensor to cause oscillations to cease. The inductive sensing element is usually realized by attaching a discrete inductor to a signal conditioner chip. This makes the sensor quite large, unreliable, and expensive. This type of sensing element is also affected by fluids that contain magnetic particles and cannot distinguish between the target and other close moving objects.

Radar-type sensing elements generally transmit electromagnetic energy and monitor the reflected energy to determine the distance to the target. These sensing elements rely on the Doppler effect, wherein the relative frequency of the returning energy is modulated by the speed of the target. As the target moves toward the sensing element, the returned frequency steadily increases. As the target moves away, the returned frequency decreases. If the target is standing still or moving very slowly, the returned frequency is the same or is so close to the original that detection of any difference is impossible. Thus Doppler-type radar sensing elements are not suitable for monitoring the proximity of an object that may remain in one or more positions for any length of time. Prior radar sensing elements are generally realized using printed circuit boards and a discrete antenna and therefore are quite large, relatively unreliable, and expensive.

Sensor Signal Conditioners

The most common use of a proximity sensor is for tracking the rotational movement of a gear or wheel or the position of an object such as a valve that can attain two or more preset positions, such as fully closed, halfway open, or fully open. In either case the signals from the sensing element will be the same for either a wheel with two tabs and a slot or a valve with three positions. The output of the proximity sensor is in the form of two digital pulses that are generated when the target moves beyond one of two preset points or when the valve attains one of three preset positions.

The pulses are switched on and off when the wheel rotates to a position such that the side of one of the tabs is directly in front of the sensor. The switch point is chosen along the sides of the tabs because this is the point at which the sensing element signal changes at its maximum rate for any given rotational velocity. This allows the minimum amount of hysteresis to be used in the pulse generation switching components in the signal conditioner. One pulse is generated when the side of the longest tab passes the sensor, and another when the side of the intermediate length tab passes. Both pulses are turned off when the side of the slot passes in front of the sensor.

Pulse generation is accomplished by comparing the output of the sensing element with two predetermined reference voltages stored in the signal conditioner, and generating pulses when the signal passes through these references. For instance, when the slot is in front of the sensor, the signal level is 4 volts; when the intermediate tab is in front, the signal level is 4.5 volts; and when the longest tab is in front, the sensing element output is 5 volts. The two switch points for the signal conditioner are then set to 4.25 and 4.75 volts. When the wheel rotates such that the side of the intermediate tab shared with the slot passes directly in front of the sensor, the signal level changes rapidly from 4 to 4.5 volts, and the first pulse is generated as it passes through 4.25 volts. As the wheel rotates farther, the side of the longest tab shared with the intermediate tab passes directly in front of the sensor, and the signal level changes rapidly from 4.5 to 5 volts. The second pulse is then generated as the signal level passes through 4.75 volts. As the wheel rotates farther, the side of the longest tab shared with the slot passes, and the signal level changes rapidly from 5 to 4 volts. Both pulses are turned off rapidly in succession as the signal level passes first through 4.75 volts and then through 4.25 volts.

The biggest problem with proximity sensors is encountered when setting these reference voltages. Due to electrical and physical differences between any one set of sensors and targets, the signal levels from any two sets of sensing elements in any two applications of the sensor can vary widely. Targets may be closer or farther away, may be larger or smaller, or more or less material may be placed in close proximity to the sensor, changing the sensing element signal levels significantly. The electrical characteristics of the sensing element and of calibration elements in the signal conditioner will also vary from one sensor to the next.

The signal conditioner sets these references by first determining the signal level from the sensing element when the slot and then the longest tab is directly in front of the sensor. It then sets the lowest reference to a value one-third of the difference between the two extremes, and sets the highest reference to two-thirds of the difference between these two extremes. These become the switch points at which the sensor output pulses are generated. In the example above for the range of 4 to 5 volts, the two references are set to 4.25 and 4.75 volts; so the sensor switches output when the sides of the tabs are encountered.

Generally in currently known sensors this is done either by storing the analog voltage from the sensing element when the longest tab and the slot are in front of the sensor on two capacitors or by converting the levels to digital form and setting digital memory circuits to discrete numbers representing the reference levels. The problem with storing the levels on a capacitor are twofold: The first problem arises because the voltage stored on the capacitor constantly leaks off and must therefore be restored periodically. To overcome this, the signal conditioner stores this voltage on one capacitor each time the signal from the sensing element reaches its maximum level when the longest tab is in front of the sensor, and stores the voltage on the other capacitor when the signal level attains its minimum value when the slot is in front.

The capacitor must be large enough to hold a charge until the wheel turns again to the point where the longest tab or the slot is in front of the sensor. For most mechanical objects this requires a rather large capacitor. It is difficult to produce a sufficiently large capacitor to hold these charges for sufficient periods of time on an integrated circuit chip. The capacitor is therefore usually realized off-chip and connected electrically to the signal conditioner. This makes it expensive to manufacture, reduces its reliability, and makes the sensor rather large in diameter.

The second problem with the capacitor reference method is also caused by constant dissipation of the stored energy in the capacitor. Thus the level must constantly be refreshed, or it will leak to zero. This refreshing can only be done when the signal from the sensing element is at its minimum or its maximum, when either the longest tab or the slot is directly in front of the sensor, or when the valve is fully open or fully closed. It cannot be done while the wheel is between either of these two positions. For this reason the object being monitored by this method must constantly be moving into one of these two extreme positions. If it stops at any other position or moves too slowly, the reference voltage will drop, and the next signal may not be generated correctly when the target resumes movement or speeds up.

The second method of setting the references is to use digital circuitry. The problem with this method is that a large amount of electronic circuit components must be used to get even modest precision. This technique requires an analog-to-digital converter to digitize the sensing element output, two digital storage sections to store the maximum and the minimum levels, and a digital-to-analog converter to reconvert the number back to a voltage level. The large amount of components required makes this method neither economical nor reliable and also requires the sensor to be relatively large to accommodate the extensive number of components.

Proximity Sensors

Generally, magnetic sensing elements are less expensive than electrical sensing elements. However, not all targets can be made of magnetic material, and sometimes it is impractical to place a magnet in the sensor environment because the magnet could have a detrimental effect on the machine. Thus in any one application the more expensive electric sensor may be required. However, in both cases the signal conditioner would be the same. The ideal proximity sensor would provide a signal conditioner that could accommodate either type of sensing element. Generally proximity sensors have not been designed to take advantage of the economy of scale that could be realized if the sensing element and signal conditioner parts were interchangeable.

Proximity sensors have generally been designed to be held in place with external screws or clamps because of their relatively large mass.

SUMMARY OF THE INVENTION

It is therefore an object of this invention to provide an improved proximity sensor that detects the movement of small objects.

It is an additional object to monitor the movement of an object made of magnetic material without requiring that the object be magnetized or have a magnet attached.

It is another object to monitor the proximity of an object that has a conductive surface that is not necessarily made of magnetic material.

It is a further object to sense the proximity of a small object while ignoring the effects of other objects that move into close proximity to the target object.

It is yet an additional object to determine the proximity of an object moving with any speed down to zero without an inordinate amount of components.

It is yet another object to provide a sensor that can be inexpensively tailored to use one of two magnetic sensing elements to detect objects made of magnetic material, or to use an electromagnetic sensing element to detect nonmagnetic objects with conductive surfaces.

It is also an object to provide a reduced-diameter proximity sensor.

It is yet a further object to provide a sensor that can be simply and removably secured to a wall.

These and other objects are satisfied by the present invention, comprising a system for sensing a position of a target having two primary electronic components. A sensing element generates a signal that is a function of the distance to the target. A signal conditioner compares the output of the sensing element to preset references and delivers digital pulses that turn on when the target moves past a certain point.

A gear has numerous gear teeth, all the same height, with equal depth slots placed between each tooth. A wheel is similar to a gear but is fitted with two tabs, one longer than the other, and is used to determine the velocity as well as the direction of rotation. The sensor is placed adjacent to these tabs such that the distance from the sensor to the components of the wheel changes as much as possible when the wheel rotates. The tabs are placed next to each other, with a slot between each set of two tabs in stairstep fashion, so that as the wheel turns past a certain point in a certain direction the sensor encounters first a slot, then the longest tab, and then the intermediate length tab. When the wheel rotates in the opposite direction the sensor encounters first a slot, then the intermediate length tab, and then the longest tab. This allows the direction of rotation to be determined by determining whether the longest tab or the intermediate length tab immediately follows the passing of the slot.

This invention also accomplishes the preceding objectives by placing any one of several sensing elements onto a common signal conditioner chip. The sensor can be equipped with, for example, a millimeter wave (MMWave) electromagnetic sensing element to sense conductive objects, a Hall element to sense relatively large objects made of magnetic material, or a magnetoresistor to detect relatively small objects made of magnetic material. This allows the signal conditioner portion of the sensor to be manufactured as a chip in large quantities and easily applied to any sensing element. It also allows the same equipment to be used to monitor any of these sensors with little setup and calibration required.

This invention also provides an integrated circuit sensor chip that has the smallest possible surface area facing the target to achieve the smallest possible diameter for the sensor. This is accomplished by forming the signal conditioner on a chip, and then placing the magnetic sensing element on the side of the signal conditioner chip and then turning the chip on its side so the sensing element faces the target. This allows the diameter of the sensor to be determined solely by the size required for the sensing element.

This invention also provides a signal conditioner capable of generating at least three distinct signals when the target moves to one of up to three corresponding positions. This is accomplished by a reference voltage detection and storage circuit. This system uses neither large capacitors nor digital storage techniques; all components are on-chip, making the sensor smaller, less expensive, and more reliable. This also allows the sensing of targets that move slowly or that may remain in one position or stop rotating for indeterminate periods of time.

The present invention also uses in one embodiment a directional antenna to narrow the range of influence of the electromagnetic sensor, allowing the electromagnetic sensor to sense smaller objects and also allowing the sensor to ignore the movement of other close objects.

This invention also teaches a physical arrangement of materials in the encapsulation material used to protect the sensor components. One part so formed is the antenna for an electromagnetic proximity sensor; the other part so formed is a magnet used in a magnetic proximity sensor.

The invention also discloses making the sensor round and providing it with attachment means adapted for mounting into a simple hole. This minimizes the amount of machining required to affix the sensor as well as the installation and removal time.

The invention provides for the insertion of a sensor into a ceramic cone bonded to a metal tube and the molding of the tube to an electrical connector to secure the sensory apparatus. This allows the length of the sensor to be changed as required by simply trimming the metal tube.

It is preferable, although not mandatory, that all sensing and signal conditioning components be arranged on a single integrated circuit for packaging into a very small and inexpensive device.

The method of the present invention comprises the steps of radiating radio frequency energy with an antenna having an impedance and positioning a moving object adjacent the antenna such that the impedance of the antenna varies with changes in the position of the object as a result of near-field effects. The changes in the impedance of the antenna due to these near-field effects are detected, and a signal is provided in response to the changes of impedance of the antenna that indicates that the position of the object has changed. Accordingly, a movement of a small object may be detected without giving a false indication due to a movements of another object adjacent the perimeter of the antenna's near field.

This invention also includes an apparatus for installing a sensor in the first aperture within a wall of a device, the aperture comprising a plug made with a resilient material and being adapted for insertion into the first aperture, the plug having a second aperture disposed therein that extends through the plug. A sensor having a connector in a tube is inserted into the second aperture, the tube having an upper portion coupled to the connector with a plurality of spiral barbed edges, such that when the tube is inserted into the second aperture, the apparatus remains securely fastened to the wall of the device, and when the tube is rotated the apparatus releases from the device. This apparatus fits a sensor to be mounted within the wall while providing a leak-free seal between the sensor and the wall.

The invention further includes a network that finds the highest and the lowest signal voltages that represent the total excursion of the target, and then applies these two voltages across a voltage divider network. The appropriate percentage of this voltage is then tapped off and used as a threshold voltage for a comparator.

BRIEF DESCRIPTION OF THE DRAWINGS

FIG. 3 is a view of the sensor chip with an orthogonal sensing element.

FIG. 4a is a sectioned top view of the electromagnetic sensor.

FIG. 4b is a side view of the sensor shown in FIG. 4a.

FIG. 5 is a sectioned top view of the magnetic sensor.

DESCRIPTION OF THE PREFERRED EMBODIMENTS

A detailed description of the present invention will now follow with reference to FIGS. 1–6.

The Hall element and magnetoresistor sensing elements will be referred to simply as magnetic sensing elements. The Hall element, magnetoresistor, and millimeter wave sensing elements will be referred to as sensing elements. Where a specific sensing element is discussed, it will be referred to by its full name.

Basic Sensor Operation

Figure 1:
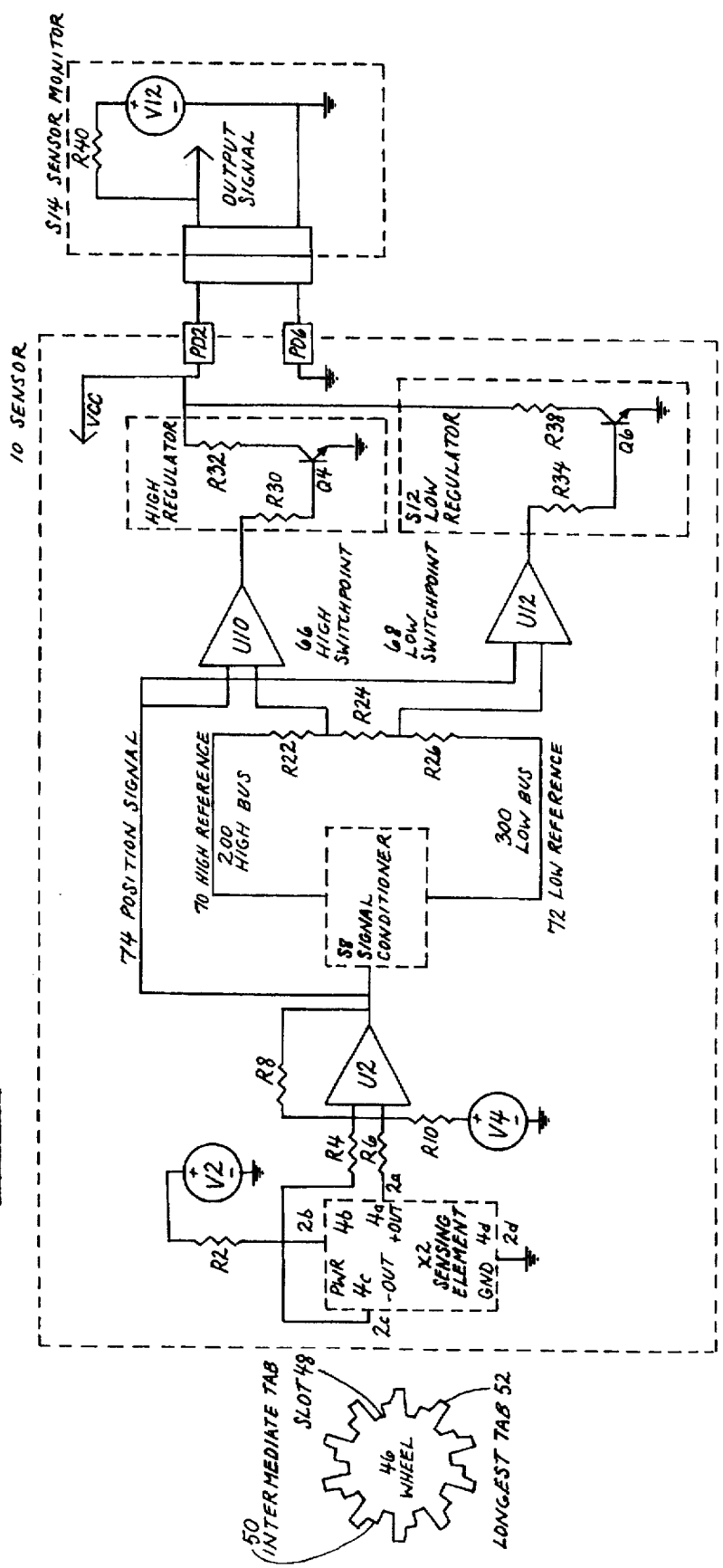
FIG. 1 is a simplified block diagram of the sensor.

Referring to FIG. 1, there is shown a simplified block diagram of sensor 10 configured as a directional velocity sensor and connected to sensor monitor S14. This diagram also shows a target wheel 46 with slot 48, intermediate tab 50, and longest tab 52. In this application sensor 10 monitors the directional velocity of wheel 46 and delivers two pulses to sensor monitor S14. As wheel 46 rotates in front of sensor 10, certain parts of the target pass into closest proximity to the sensor 10. As shown, when wheel 46 rotates clockwise, the closest part of wheel 46 is first slot 48; then as the wheel 46 rotates, the closest part becomes longest tab 52; then as wheel 46 rotates further, the closest part becomes intermediate tab 50.

A signal is generated in sensing element X2 that is inversely proportional to the distance between the closest part of wheel 46 and sensing element X2. The signal from sensing element X2 is highest when longest tab 52 is directly in front of sensing element X2 and is lowest when slot 48 is in front of sensing element S2. This signal is connected to differential amplifier U2 through metal conductors 4A and 4C, integrated conductors 2A and 2C, and then through resistors R4 and R6. Also connected through resistor R10 to the minus input of differential amplifier U2 is offset generator V4. The output of offset generator V4 helps cancel the effect of static offset signals from sensing element X2 caused by the sensing of other objects that are not wheel 46 such as the mechanical structure holding the wheel 46 or from the sensing of the material contained in the wheel 46 itself.

The output of differential amplifier U2 is position signal 74, an analog signal that is a function of the distance between the wheel 46 and sensor 10. When the longest tab 52 is in front of the sensor the signal is at its highest level, and when the slot 48 is in front of the sensor the signal is lowest. Sensor element power is supplied by power supply V2 through resistor R2.

Signal conditioner S8 determines the value of position signal 74 when it is at its highest and its lowest point. Signal conditioner S8 stores a voltage on high bus 200 that is equal to position signal 74 voltage when the longest tab 52 is in front of the sensor. This voltage so stored becomes high reference 70. Signal conditioner S8 stores a voltage on low bus 300 that is equal to position signal 74 voltage when slot 48 is in front of the sensor. This voltage so stored becomes low reference 72.

Signal conditioner S8 applies high reference 70 and low reference 72 across a voltage divider network composed of three equal-valued resistors R22, R24, and R26. The voltage at the connection between resistors R24 and R26 is one-third of the voltage differential between low reference 72 and high reference 70 and is called the low switch point 68. This represents the value of position signal 74 when the wheel 46 is turned so the sensor is directly in front of the side of the intermediate tab 50 shared with slot 48. The voltage at the connection between resistors R22 and R24 is two-thirds of the voltage difference between low reference 72 and high reference 70 and is called the high switch point 66. This represents the value of position signal 74 when the wheel is turned so the sensor is directly in front of the side of the longest tab 52 shared with intermediate tab 50. Low switch point 68 and high switch point 66 are the points at which the sensor 10 output will change as wheel 46 rotates.

High switch point 66 and low switch point 68 are connected to reference pins on comparators U10 and U12, respectively. The outputs of these comparators are connected through resistors R30 and R34 to transistors Q4 and Q6. The collectors of these transistors are connected to sensor power through resistors R32 and R38. Sensor power is supplied by power supply V12 through signal resistor R40. The sensor output signal 76 is connected to the sensor at the same point as signal resistor R40. Sensor output signal 76 is inversely proportional to the current through signal resistor R40. As the current drawn by the sensor increases, the voltage dropped across signal resistor R40 increases, and correspondingly the value of output signal 76 decreases. When transistor Q4 or Q6 is turned on, it decreases the effective resistance of sensor 10 and increases the current through signal resistor R40, causing a corresponding decrease in output signal 76. Comparators U10 and U12 are connected such that both transistors Q4 and Q6 are normally on when slot 48 is directly in front of sensor 10. Either transistor Q4 or Q6 is turned off when either intermediate tab 50 or longest tab 52 rotates to the front of the sensor. This is done to allow the voltage level of output signal 76 to increase in a positive direction when the wheel 46 approaches sensor 10. This makes the output condition of the sensor easier to assess by service personnel.

When slot 48 rotates to the front of sensor 10, position signal 74 is lower than high switch point 66 and low switch point 68, and both comparators U10 and U12 are turned on. This keeps switching transistors Q4 and Q6 both turned on. The current through R40 is the sum of the current drawn by the components of the sensor connected to point VCC added to the currents drawn by transistors Q4 and Q6. When wheel 46 rotates counterclockwise, intermediate tab 50 rotates to a position directly in front of sensor 10. Position signal 74 rises to a value higher than low switch point 68. Comparator U12 turns off, switching transistor Q6 off. Thus a current pulse of a first level is subtracted from the current drawn by sensor 10, increasing the value of output signal 76. As wheel 46 continues to rotate, longest tab 52 becomes closest to sensor 10. Position signal 74 increases to a value higher than high switch point 66. U10 turns off, turning off transistor Q4. This decreases the current through R40 and increases output signal 76 value.

The values of resistors R32 and R38 are equal, and the current gains of transistors Q4 and Q6 are both equal. When each switching transistor Q4 and Q6 turns on, they both allow the same amount of current to flow through signal resistor R40. Note that whenever comparator U10 is turned on, comparator U12 is also always on because position signal 74 exceeds the value of high switch point 66 as well as that of low switch point 68. This serves to halve the amount of current drawn through signal resistor R40 when longest tab 52 is in front of the sensor compared to the amount of current drawn when intermediate tab 50 is in front of the sensor. When the longest tab 52 is in front of the sensor, both comparators U10 and U12 are turned off. In this situation the only current through signal resistor R40 is that drawn by the sensor itself during normal operation. If this is 1 mA and each transistor Q4 and Q6 draws 1 mA, the sensor output will change from 3 mA when slot 48 is in front of the sensor to 2 mA when intermediate tab 50 is in front of the sensor, and then to 1 mA when longest tab 52 is in front of the sensor.

Note that the sequence of output pulses is a-b-c-a-b-c . . ., where a is the value of output signal 76 when sensor 10 faces slot 48, b is the value of output signal 76 when sensor 10 faces intermediate tab 50, and c is the value of output signal 76 when sensor 10 faces longest tab 52. This sequence occurs when wheel 46 is rotating counterclockwise. If wheel 46 rotates clockwise, longest tab 52 follows slot 48. The sequence of output pulses then becomes a-c-b-a-c-b . . . . Monitoring equipment connected to the sensor output then determines whether pulse b or pulse c immediately follows the detection of pulse a to determine the direction of rotation of wheel 46.

Detailed Signal Conditioner Operation

Figure 2:
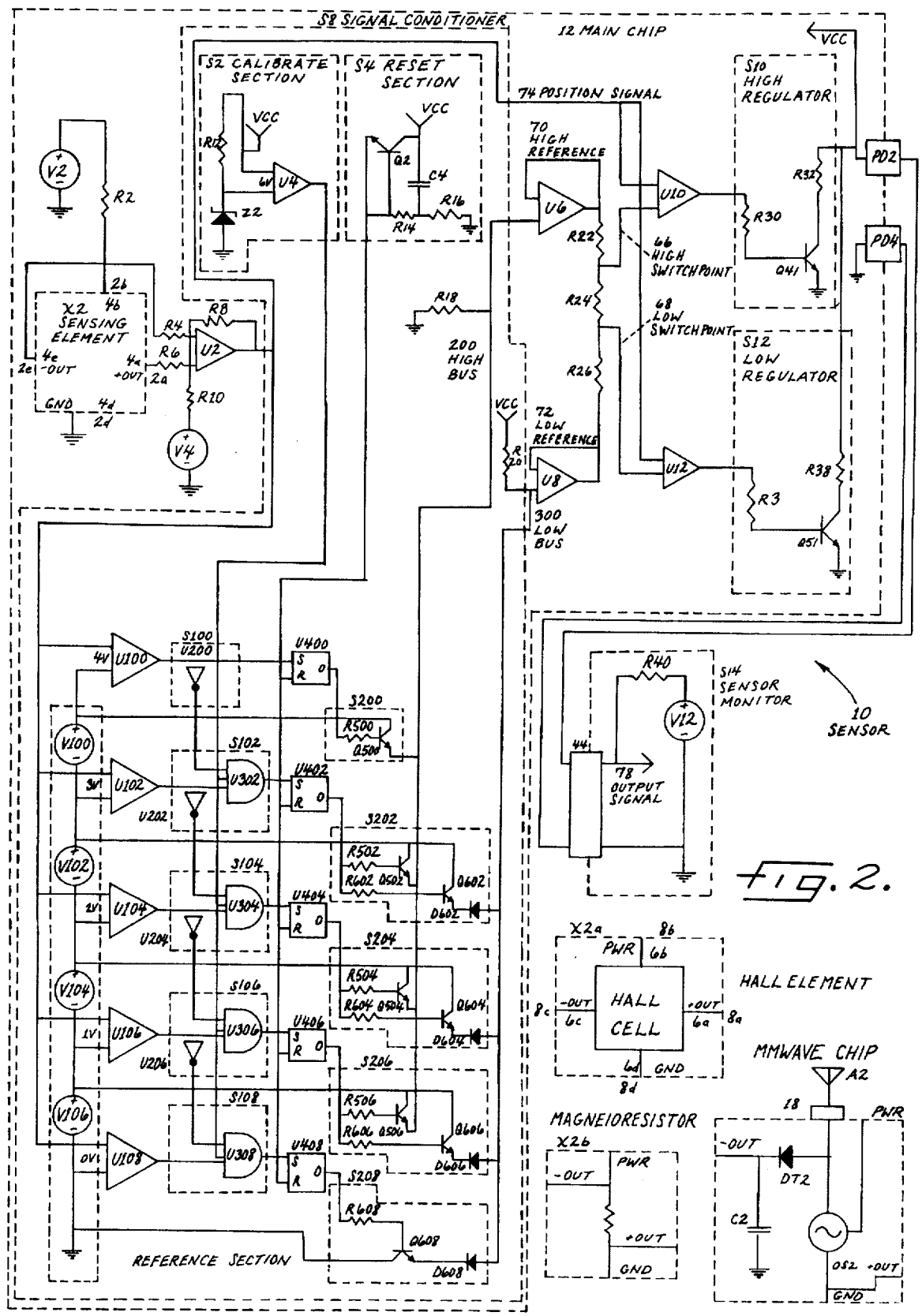
FIG. 2 is a detailed schematic diagram of the sensor.

FIG. 2 shows the sensor 10 schematic, including main chip 12; sensing elements X2, which comprise Hall element X2a, magnetoresistor X2b, or millimeter-wave chip X2c; signal conditioner S8; and sensor monitor S14. As discussed, signal conditioner S8 generates high switch point 66 and low switch point 68 by placing a voltage equal to the maximum value of position signal 74 on high reference 70 and by placing a voltage equal to the minimum value of position signal 74 on low reference 72. This is accomplished as follows:

Signal conditioner S8 includes comparators U100–U106 coupled through logic sections S100–S108, flip-flops U400–U408, and bus drive sections B200–S208. Logic sections S100–S108 include inverters U200–U206 and AND gates U302–U308. Signal conditioner S8 also includes calibrate section S2 and reset section S4. Reset section S4 serves to clear any previous settings of signal conditioner S8 and operates when power is first applied to sensor 10. Calibrate section S2 serves to restrict operation of signal conditioner S8. Signal conditioner S8 does not reset high reference 70 and low reference 72 unless a signal is generated by calibrate section S2.

When calibrate section S2 output is enabled, signal conditioner S8 compares position signal 74 to the voltage already present on low bus 200 and high bus 300 and switches the bus voltage higher or lower as needed until high bus 200 matches the highest position signal 74 and until low bus 300 voltage matches the lowest position signal 74. Operation of signal conditioner S8 is as follows:

When power is initially supplied to sensor 10 by sensor monitor S14, capacitor C4 in reset section S4 begins to charge to supply voltage VCC through resistor R16. At first, there is no voltage dropped across capacitor C4; so the voltage at the junction of R14 and R16 is equal to supply voltage VCC. This places supply voltage VCC on the base of transistor Q2, causing it to turn on and to apply supply voltage VCC to its emitter through its collector. The emitter of transistor Q2 is connected to the reset pins of flip-flops U400–U408. This causes them to all be reset, placing a logic low voltage on all Q outputs of flip-flops U400–U408. This logic low is applied to the bases of all transistors Q500–Q506 and Q602–Q608 and turns them all off. The emitters of Q500–Q506 are connected to high bus 200. Resistor R18 pulls the voltage on high bus 200 to ground when all transistors Q500–Q506 are off. The emitters of Q602–Q608 are connected to low bus 300. Resistor R20 pulls the voltage on low bus 300 to the value of sensor power VCC when all transistors Q600–Q608 are off. Thus reset section S4 serves to apply the lowest voltage available (ground) to high bus 200 and the highest voltage available (VCC) to low bus 300. Capacitor C4 continues charging until fully charged. At this time current through R16 ceases. The voltage at the base of Q2 then returns to ground potential, turning transistor Q2 off and disabling the reset voltage on flip-flops U400–U408.

Sensor monitor S14 applies 7 volts initially to sensor 10 upon power-up. This is done only when signal conditioner S8 is to be recalibrated such as during initial power-up. This VCC at 7 volts is applied to calibrate section 82 at the top of resistor R12, which is connected to zener diode Z2, which maintains 6 volts on its top terminal. This serves to apply 7 volts to the "+" input pin of comparator U4 and applies 6 volts to the "−" pin of comparator U4. This brings the output of comparator U4 to a high value near the value of VCC. This is applied to the middle input pins of three-input AND gates U302–U308. The signal conditioner section S8 is now enabled. PD2 and PD6 represent sensor wire bond pads.

During calibration wheel 46 must rotate at least enough to place slot 48 and then longest tab 52 in front of sensor 10. This allows position signal 74 to attain its minimum and its maximum values. Position signal 74 is applied to the "+" input of a series of comparators (U100–U108). Applied to each threshold "−" input of these comparators (U100–U108) is a voltage taken from reference section S6 that includes a series of voltage references V100–V106. Each reference has a voltage differential of 1 volt. The threshold voltage on each comparator (U100–U108) therefore is about 1 volt higher than the voltage on the comparator below it. The result is that each comparator (U100–U108) will be on (output high)

when the voltage of the input signal is higher than its threshold voltage.

All of the comparators having a threshold voltage below position signal 74 will be on, and all those comparators having a threshold voltage higher than position signal 74 will be off. For example, when wheel 46 rotates such that slot 48 is in front of sensor 10, and given an example position signal 74 of 2.25 volts for this situation, comparator U104 and all comparators below (U106 and U108) will be on, and all comparators above (U100 and U102) will be off.

The output of each comparator U100–U108 goes to logic sections S100–S108. One output goes straight into the lowest input of an AND gate (U302–U308) in one of the logic sections. The other output of the comparator goes to an inverter (U200–U206) whose output is connected to the highest input pin of an AND gate (U302–U308) below it. The output of comparator U100 goes directly through logic section S100 to flip-flop U400. At only one logic section S102–S108 will both top and bottom inputs to any AND gate (U302–U308) be high.

For the example above, with a signal of 2.25 volts, comparator U104 will be on, U100 and U102 will be off, and AND gate U304 will be on. All comparators (U106 and U108) below comparator U104 will also be on, delivering a high state to the inverter below them (U206), which places a low state on the AND gate U308. None of the comparators above comparator U104 will be on, delivering a low state to AND gate U302 and flip-flop U400 connected directly to comparator U100 output.

Whichever AND gate U302–U308 is on applies a high voltage to the set pin of its corresponding flip-flop U402–U408. This brings its "Q" output high and turns on the appropriate transistors Q500–Q506 and Q602–Q608 through resistors R500–R506 and R602–R606. The collectors of transistors Q500–Q506 and Q602–Q608 are connected to an appropriate reference V100–V106. The emitters of transistors Q500–Q506 are connected to high bus 200. The emitters of transistors Q602–Q608 are connected through blocking diodes D602–D608 to low bus 300. The result is that the appropriate voltage representing the level of position signal 74 is electrically switched onto high bus 200 and low bus 300. In the example above for a position signal 74 voltage of 2.25 volts, flip-flop U404 will be on and will enable transistors Q504 and Q604, placing 2 volts on high bus 200 and on low bus 300.

Wheel 46 is then allowed to rotate such that longest tab 52 is directly in front of sensor 10. Position signal 74 then goes to its highest value, enabling appropriate comparators U100–U108 as signal levels rise above appropriate reference voltages from V100–V106. This in turn enables appropriate flip-flops U400–U408, allowing transistors Q500–Q506 and Q602–Q608 to place appropriate voltages on high bus 200 and low bus 300. Whichever flip-flop U400–U408 below the appropriate flip-flop U400–U408 was enabled by the level of position signal 74 when slot 48 was directly in front of sensor 10 will remain set, also enabling corresponding transistors Q500–Q506 and Q602–Q608. Also, any flip-flops U400–U408 between the flip-flop U400–U408 set when slot 48 was directly in front of sensor 10 will also be enabled.

Any number of transistors Q500–Q506 and Q602–Q608 will therefore be enabled when wheel 46 turns to place slot 48 and then longest tab 52 in front of sensor 10. Each transistor Q500–Q506 will attempt to place a lower voltage on high bus 200 than the transistor Q500–Q506 above it. When any two transistors Q500–Q506 are enabled, the voltage being placed on high bus 200 by any transistor will serve to reverse bias the base-emitter junction of all transistors Q500–Q506 below it, disabling them.

Each transistor Q602–Q608 will also attempt to place a higher voltage on low bus 200 than the transistor Q602–Q608 below it. However, blocking diodes D602–D608 will become reverse biased by the reference voltage placed on low bus 300 by any transistor Q602–Q608 above it. When any two transistors Q602–Q608 are enabled, the voltage being placed on low bus 300 will serve to reverse bias the junction of all blocking diodes D602–D608 below it, preventing them from applying any other reference voltage to low bus 300.

In the example above, assuming a reference signal 74 of 3.25 volts when longest tab 52 is directly in front of sensor 10 and with 2 volts already applied to high bus 200 and low bus 300, comparator U102 will be on and comparator U100 will be off. AND gate U302 will be enabled, setting flip-flop U402. The "Q" outputs of both flip-flop U402 and U404 will both be on, turning on transistors Q502 and Q504 and transistors Q602 and Q604. Transistor Q502 will apply 3 volts to high bus 200. This 3 volts will be higher than the 2 volts being applied by transistor Q604 and will reverse bias its base-emitter junction. Transistor Q604 will apply 2 volts through blocking diode D604 to low bus 300, while transistor Q602 attempts to apply 3 volts through blocking diode D602. The 2 volts applied through blocking diode D604 will reverse bias blocking diode D602. The result will be 3 volts on high bus 200 representing position signal 74 when longest tab 52 is in front of sensor 10, and 2 volts on low bus 300 representing position signal 74 when slot 48 is in front of sensor 10.

After wheel 46 has rotated to place at least one slot 48 and one longest tab 52 in front of sensor 10, sensor monitor S14 lowers sensor supply voltage VCC to 5 volts. This places 5 volts on the "+" pin of comparator U4 in calibrate section S2. Due to the turnoff delay of zener Z2, 6 volts will remain on the "−" pin of U4 for a finite amount of time. Comparator U4 output will go low, disabling AND gates U302–U308. All flip-flops U400–U408 will remain set. The voltages placed on high bus 200 and on low bus 300 will remain set to their highest and lowest values achieved by position signal 74. The result is that high reference 70 will be equal to the value of position signal 74 when longest tab 52 is in front of sensor 10, and low reference 72 will be equal to the value of position signal 74 when slot 48 is in front of sensor 10. Sensor 10 is now calibrated. As wheel 46 rotates, sensor 10 output will change as required.

Signal conditioner S8 is shown with only 5 voltage taps: 0, 1, 2, 3, and 4 V. Other applications may require different numbers of references and different values for these voltages. Specifically, higher resolution will require more references. Also, different reference section components S8 can be used to obtain these voltages. All analog switch transistors Q500–Q506 and Q602–Q608 are shown as bipolar; however, any device can be used provided it will pass the appropriate value and provided the bus voltage selection of highest or lowest of any plurality is maintained.

Magnetic Sensing Element Operation

In FIG. 3 Hall element X2a or magnetoresistor X2b is shown placed at right angles to signal conditioner S8 circuitry and other sensor 10 circuitry on main chip 12. All circuit components comprising signal conditioner S8 and other sensor 10 components are formed on the surface of a wafer, then main chip 12 is cut from this wafer. In addition to other circuit components, integrated conductors 4a–4d are formed on main chip 12 by heavily doped semiconductor material. Metal conductors 2a–2d are then placed over integrated conductors 4a–4d. Main chip 12 is then rotated 90 degrees, and integrated conductors 8a–8d and metal conductors 6a–6d are formed on the side of main chip 12. Metal conductors 2a–2d and 6a–6d are placed directly over integrated conductors 4a–4d and 8a–8d and serve to electrically connect signal conditioner S8 to magnetic sensing element X2. Then either Hall element X2a or magnetoresistor X2b is formed on the side of main chip 12. The result is a magnetic sensing element X2 formed at right angles to main chip 12 components. The surface area required for sensing element X2 is much smaller than the surface area required for remaining sensor 10 circuit components. This serves to make sensor 10 as small in diameter as possible in a plane facing the wheel 46.

In FIG. 5 are shown magnetic sensor 56 with output wire 58 and ground wire 60, magnetic material 16, and nonmagnetic material 14. Main chip 12 is attached to output wire 58 and ground wire 60 using conductive epoxy. This assembly is then encapsulated partially with magnetic material 16 behind magnetic sensing element X2a or X2b. Nonmagnetic material 14 is then placed around main chip 12. Magnetic material 16 is magnetically charged in a direction parallel to a line drawn between magnetic material 16 and magnetic sensing element X2. This forms the magnet required by magnetic sensing element X2. The magnetic lines of flux leaving magnetic material 16 are then concentrated by magnetic material in close proximity to sensor 10. When longest tab 52 is directly in front of sensor 10, the magnetic lines of flux are more concentrated than when slot 48 is in front of sensor 10. These changes in magnetic flux concentration at magnetic sensing element X2 then cause the output of magnetic sensing element X2 to change proportional to the position of wheel 46.

Electromagnetic Sensing Element Operation

In FIGS. 4a and 4b are shown top and side views of sensor 54 with electromagnetic sensing element X2 composed of MMwave chip X2c, ring converter 18, antenna X2, and nonmagnetic material 14. The electromagnetic sensor works by positioning an antenna that radiates radio frequency energy in close proximity to the wheel 46. The radio frequency signal is shaped by the antenna, resulting in a narrow electromagnetic field that charges the surface of the wheel 46. The wheel 46 surface charges with a thin layer of moving conductors because the radio frequency signal is of an extremely short wavelength compared to the distance from the surface of the wheel 46 to the ground point of the wheel 46. At this frequency most of the electrical energy is concentrated in a thin layer on the surface of the wheel 46.

The amount of energy contained on the surface of the wheel 46 as well as the distance between the wheel 46 and the antenna form a system of antenna and antenna element. The wheel 46 serves to change the impedance of the antenna system by allowing more or less energy to be transmitted by the antenna. This is done when the wheel 46 is placed in the near field of the antenna, the area closest to the antenna wherein the electric field of the antenna has a stronger component than the magnetic component of the field. Changing the distance between the antenna and the wheel 46 serves to modulate the impedance of the antenna as the wheel 46 moves in the antenna's near field. The energy reflected from the wheel 46 to the antenna is therefore directly proportional to the distance to the wheel 46. This energy is coupled from the antenna by a directional coupler, which is then connected to a detector. The reflected energy is then converted to an analog voltage directly proportional to the distance to the wheel 46. In any range of wheel 46 size, shape, and range of movement, the impedance of the antenna can change from capacitive impedance to purely resistive impedance to inductive impedance or to any range between. The sensor position is adjusted to keep the antenna impedance in either the capacitive or in the inductive range to ensure that the output signal changes linearly with wheel 46 position.

MMWave chip 12 includes an oscillator OS2 that generates radio frequency energy. Oscillator OS2 may be any state-of-the-art millimeter wave oscillator, however, the preferred embodiment is an impact avalanche transit time diode (IMPATT) because it can be easily implemented in silicon and operates at a high frequency and temperature. Oscillator OS2 may comprise several similar devices that are optimized to operate at radio frequencies through various temperature ranges. Oscillator OS2 may also contain power circuits that automatically compensate for temperature or frequency drift in the output level of oscillator OS2. These various oscillators also may be automatically switched into the circuit as the temperature changes. Examples of oscillator OS2 may include transferred electron devices, IMPATT diodes, trapped plasma avalanche triggered transit time diode, tunnel diode, field effect transistor, bipolar transistor, high electron mobility transistor, or any other solid-state oscillator. Many examples of IMPATT oscillators achieved in monolithic circuits are well known in the art and are composed of IMPATT diodes produced in planar configuration and surrounded by monolithic ring inductor or other required element(s). Examples of how these IMPATT diodes are manufactured and designed are described in the chapter on "Millimeter Wave Silicon Devices" by P. Russer in *Vacuum*, Vol. 41, Nos. 4–6, pgs. 1033–37 (1990) published by Pergamon Press and references cited therein.

The power level of oscillator OS2 is kept low (below 5 mW total power) to reduce heat generation and thereby increase the lifetime of the circuit components.. The frequency of oscillator OS2 is preferably in the range of 50–150 GHz and is selected such that the wavelength of the radio frequency energy emitted from antenna A2 is less than or equal to the smallest distance across the face of a target, such as a wheel 46, which has a slot 48 and a longest tab 52.

MMWave chip X2c also includes directional coupler DC2. The radio frequency output signal is then passed through the output connection of directional coupler DC2 to antenna A2 radiating toward the target 78. Antenna A2 is connected with conductive epoxy to directional coupler DC2 through antenna pad 62.

Antenna A2 then transmits the radio frequency signal through a gap between antenna A2 and wheel 46. The radio frequency signal charges the surface of wheel 46. The amount of energy contained in the reflected radio frequency signal depends on the composition of wheel 46 and on the distance between wheel 46 and antenna A2. It is preferable that wheel 46 have a surface that is electrically conductive. It is recognized that the impedance of antenna A2 changes as a function of wheel 46 to antenna A2 distance. The radio frequency signal is partially reflected from wheel 46 to antenna A2 back into the directional coupler DC2. Due to the directional nature of directional coupler DC2, the majority of this energy is not returned to oscillator OS2 but is fed to signal detector DT2.

As shown in FIG. 2, signal detector DT2 is followed by low-pass filter C2. The signal detector DT2 rectifies the alternating voltage from the directional coupler DC2 into a rectified voltage signal that is directly proportional to the distance from wheel 46 to antenna A2. Low-pass filter C2 passes only the predetermined low-frequency signal that is proportional to the distance from wheel 46 to antenna A2 and blocks the high-frequency radio signal from oscillator OS2 to thereby pass the near field frequencies which will provide data related to position or proximity of the wheel. The DC voltage signal is then passed to signal conditioner S8.

Note that MMWave chip X2c is shown as a separate chip from main chip 12. These chips are connected through metal conductors 2a–2d and 6a–6d and integrated conductors 4a–4d and 8a–8d. The two chips are placed end-to-end and connected electrically with conductive epoxy.

Electromagnetic Sensor Installation

Figure 6:
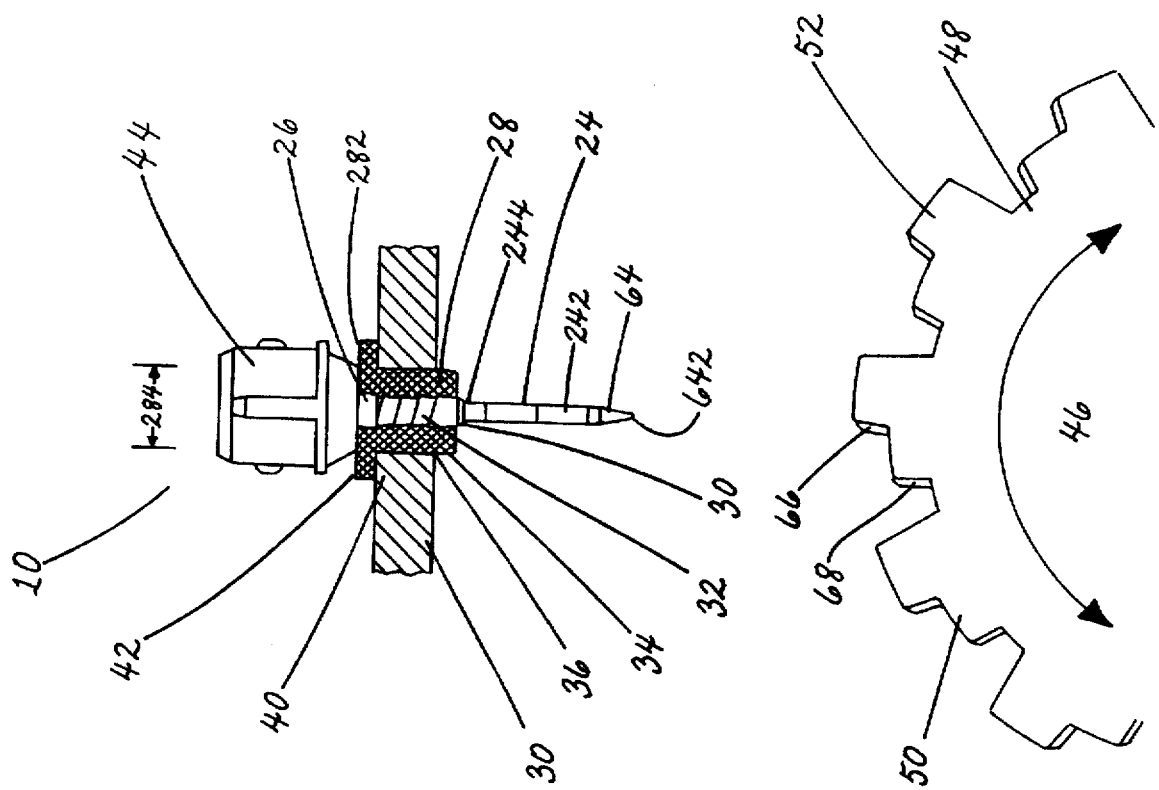
FIG. 6 shows the electromagnetic sensor installed in the wall of a housing.

Referring now to FIG. 6, sensor 54 is inserted into the proximal end 244 of a rigid tube 24. The distal end 242 of rigid tube 24 is closed with a ceramic cap 64, which is brazed to the end of rigid tube 24, forming a hermetic connection. In this fashion all sensor components 54 are shielded from contamination that may be present in the sensing environment. Ceramic cap 64 is transparent to microwave and millimeter-wave signals.

Rigid tube 24 is molded into sensor connector 44 body. Output wire 58 and ground wire 60 (FIG. 4a) are connected to sensor connector 44 blades (not visible) in the sensor connector 44 body, preferably by using welding techniques known in the art. Spiral barbs 32 are formed during the molding process about the upper end portion of rigid tube 24 such that they constitute an integral part of sensor connector 44 body. A cylindrical section 26 is formed during the molding process between spiral barbs 32 and the sensor connector 44 body. Molding compound also enters rigid tube 24 and secures sensor 54. A flexible plug 28 made from synthetic rubber or any resilient material has an outer diameter 284 dimensioned to form a seal with a simple aperture 40 through the housing wall 38 in a position to sense the moving wheel 46.

Sensor 54 is installed as follows: First a simple aperture 40 is drilled into housing wall 38. Into this aperture 40 flexible plug 28 is inserted to the point that its shoulder 42 bears against housing wall 38. At the end of the portion of flexible plug 28 that is to be inserted into housing wall 38, there is located a conical section 34 with a small shoulder 36. Conical section 34 is arranged such that after the insertion of flexible plug 28 the small shoulder 36 expands diametrically beyond the hole diameter in housing wall 38 thus arresting flexible plug 28 in the hole and preventing it from being pulled out.

After flexible plug 28 has been inserted into the hole, the entire sensor assembly is inserted into central aperture 30 in flexible plug 28 so that antenna A2 is positioned adjacent ceramic cup distal tip 642 and so that the sensor connector body proximal section is sealingly positioned against the proximal face 282 of the plug 28. The diameter of central aperture 30 in flexible plug 28 is selected such that the sides of central aperture 30 interfere with spiral barbs 32 and cylindrical section 26 of sensor 54. This interference expands flexible plug 28 when sensor 54 is inserted and thus secures flexible plug 28 and the sensor assembly in aperture 40 of housing wall 38. The above insertion process seals aperture 40 against fluids that may be present in the sensing environment from leaking through housing wall 38, and against contamination that may be present externally. To enhance the seal between flexible plug 28 and sensor 54, cylindrical section 26 is provided so that any fluids that may enter between flexible plug 28 and spiral barbs 32 cannot leak through simple aperture 40.

While sensor 54 can be installed by simply inserting it into simple aperture 40 of flexible plug 28, it cannot be removed in the same fashion due to spiral barbs 32; instead sensor 54 has to be removed by unscrewing it, thus providing safety against accidental pullout.

This concludes the description of the preferred embodiments. A reading by those skilled in the art will bring to mind various changes without departing from the spirit and scope of the invention. It is intended, however, that the invention only be limited by the following appended claims.

What is claimed is:

1. An electromagnetic system for sensing a position of a movable target having a conductive surface which includes a high surface region and a low surface region, the system comprising:

radio frequency producing means for producing radio frequency energy;

directional antenna means having an impedance and being connected to the radio frequency producing means for radiating the radio frequency energy toward a region of the target surface opposite the antenna means to thereby charge the target surface, the target surface changing the impedance of the antenna means when the target surface is in a near field of the antenna means;

detecting means responsive to said antenna means for detecting a value of the antenna means impedance;

translating means responsive to said detecting means for translating the detected antenna means impedance into a position signal;

comparing means responsive to said translating means for comparing the position signal respectively with a predetermined high reference signal and a predetermined low reference signal corresponding, respectively, to the position signal generated when the high surface region and the low surface region are positioned opposite the antenna means; and determining means responsive to said comparing means for determining the target position from the comparison of the position signal with the high and the low reference signal.

2. The system recited in claim 1, wherein the detecting means comprises a directional coupler and a signal detector connected to the directional coupler.

3. The system recited in claim 2, wherein the producing means comprises an oscillator.

4. The system recited in claim 3, wherein the oscillator comprises an impact avalanche transit time diode.

5. The system recited in claim 1, wherein the detecting means detects an impedance change by detecting an amplitude of radio frequency energy reflected from the target.

6. The system recited in claim 1, further comprising means for installing the antenna means into a housing wall having an aperture, the housing wall generally adjacent the target.

7. An electromagnetic system for sensing a position of a movable target having a conductive surface which includes a high region and a low region, the system comprising:

radio frequency producing means for producing radio frequency energy;

directional antenna means having an impedance and being connected to the radio frequency producing means for radiating the radio frequency energy toward a region of the target surface opposite the antenna means to thereby charge the target surface, the target surface changing the impedance of the antenna means when the target surface is positioned in a near field of the antenna means;

detecting means responsive to said antenna means for detecting a value of the impedance of said antenna means;

translating means responsive to said detecting means for translating the detected antenna means impedance into a position signal;

comparing means responsive to said translating means for comparing the position signal with a predetermined high and a predetermined low reference signal corresponding, respectively, to the position signal generated when the high surface region and the low surface region are positioned opposite said antenna means;

determining means responsive to said comparing means for determining the target position from the comparison of the position signal with the high and the low reference signal; and installing means for installing said antenna means into a housing wall having an aperture formed therein, the housing wall being positioned generally adjacent the target, said installing means comprising:
 a tube positioned in surrounding relation to said antenna means, the tube having an open distal end and open proximal end;
 a ceramic cap transparent to microwave and millimeter-wave energy;
 a sensor connector body affixed to the proximal end of the tube, the sensor connector body having a distal barbed section and a proximal section dimensioned larger than the distal section; and
 a flexible plug having an outer diameter dimensioned to form a seal with the housing wall aperture when inserted therein and an aperture extending therethrough dimensioned to sealingly surround the sensor connector body barbed section when the barbed section is inserted therein;
 wherein, in use, the flexible plug is inserted into the housing wall aperture, said antenna means is inserted into the proximal end of the tube sufficiently far so as to generally reach a distal tip of the ceramic cap, the ceramic cap and the rigid tube being inserted through the plug aperture, the sensor connector body barbed section being inserted into the plug aperture sufficiently far that the sensor connector body proximal section is sealingly positioned against a proximal face of the plug, the sensor connector body proximal section remaining on a proximal side of the housing wall.

8. An apparatus for sensing the proximity of a target using electromagnetic near-field effects, the apparatus comprising:

an oscillator for providing a radio frequency signal;

an antenna responsive to said oscillator for directing the radio frequency signal at the target, an amplitude of the radio frequency signal changing with a change in the target position with respect to the antenna when the target is in a near field of the antenna;

a signal detector responsive to said antenna for detecting a radio frequency signal reflected from the target;

a low-pass filter responsive to said signal detector for electronically filtering the reflected radio frequency signal and for passing a filtered signal at a predetermined frequency having an amplitude that varies with an amplitude of the reflected radio frequency signal;

a comparator responsive to said low-pass filter for comparing the filtered signal with a reference signal generated by said signal detector responsive to said antenna and said target; and determining means responsive to said comparator for determining a proximity signal indicative of a change in target position with respect to the antenna.

9. The apparatus recited in claim 8, wherein said determining means includes generating means for generating a reference signal indicating an average maximum movement of the target.

10. A method for sensing a position of a target, the method comprising the steps of:

radiating radio frequency energy with an antenna having an impedance;

moving the target sufficiently adjacent the antenna so that the antenna impedance varies with a change in the target position as a result of a near-field effect;

detecting the change in the antenna impedance in response to the changes in the target position;

translating the detected change in the antenna means impedance into a position signal;

comparing the position signal respectively with a reference signal corresponding to the position signal generated when the target is positioned within a predetermined range of the antenna; and determining the target position from the comparison of the position signal with the reference signal.

11. The method recited in claim 10, further comprising the steps of:

generating the reference signal representing an average maximum movement of the targets and wherein the determining step includes the step of providing a signal indicating the target has reached a predetermined distance when the position signal reaches a predetermined level with respect to the maximum movement reference signal.

* * * * *